Nov. 27, 1923.  
S. REES  
1,475,511  
WHEEL, PULLEY, OR THE LIKE  
Filed Aug. 2, 1923     2 Sheets-Sheet 1
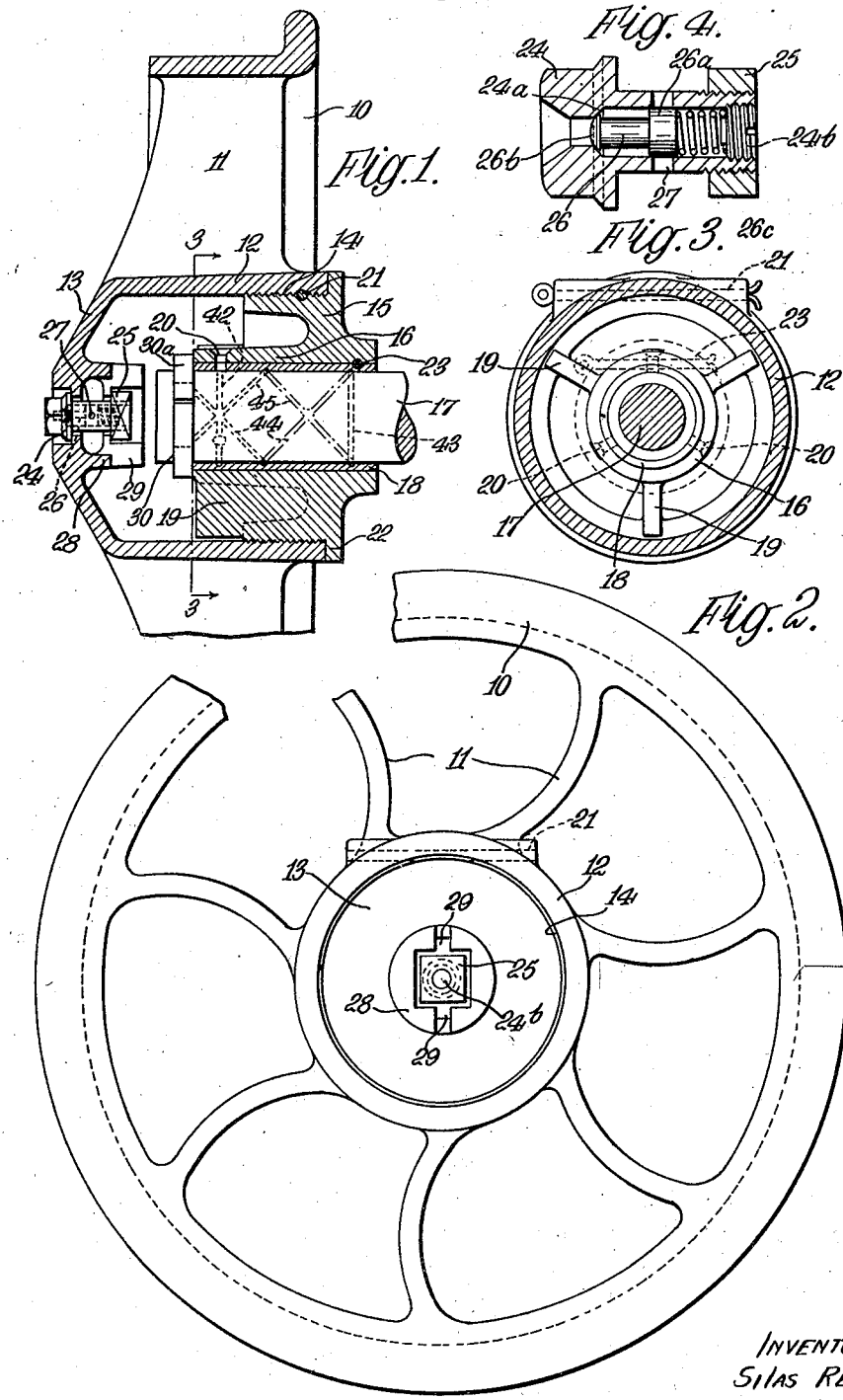
INVENTOR
SILAS REES.
per- Eugene C. Brown
ATTORNEY.

Nov. 27, 1923.  1,475,511
S. REES
WHEEL, PULLEY, OR THE LIKE
Filed Aug. 2, 1923   2 Sheets-Sheet 2
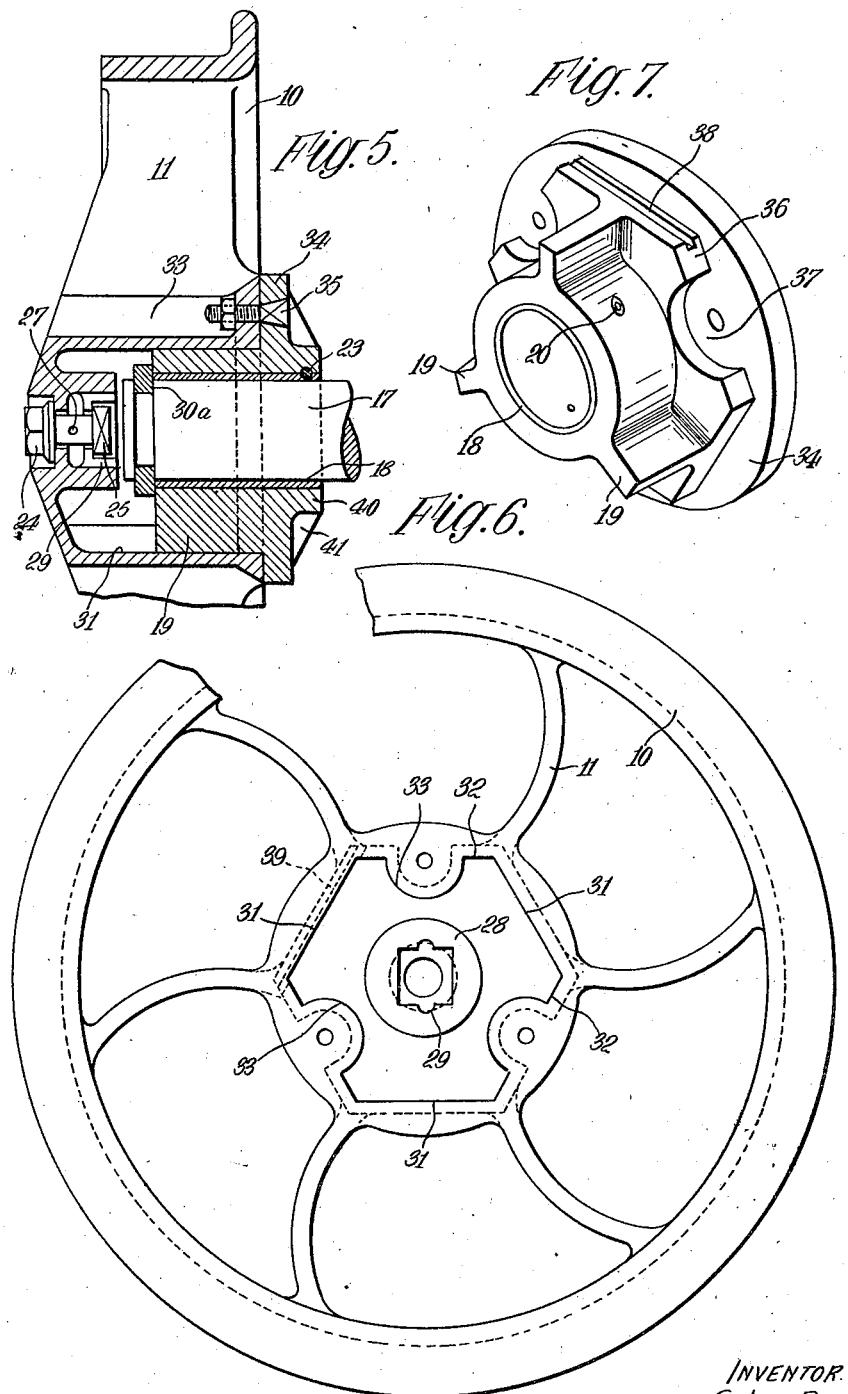
INVENTOR.
Silas Rees.
per- Eugene C. Brown
Attorney.

Patented Nov. 27, 1923.

1,475,511

UNITED STATES PATENT OFFICE.

SILAS REES, OF FRAMPTON COTTERELL, ENGLAND.

WHEEL, PULLEY, OR THE LIKE.

Application filed August 2. 1923. Serial No. 655,350.

*To all whom it may concern:*

Be it known that I, SILAS REES, a subject of the King of Great Britain, residing at Brockridge House, Frampton Cotterell, Gloucester, England, have invented certain new and useful Improvements in Wheels, Pulleys, or the like, of which the following is a specification.

This invention relates to wheels, sheaves, pulleys, rollers, or the like, and in the specification and claims here following, the word "wheel" is used to cover such other constructions, to which the present invention can be applied.

The invention has particular reference to the construction of wheels running on rails.

The main object of the present invention is to provide an improved construction of the kind adapted for use, such as in collieries, whereby an improved wheel adapted to withstand rough usage is obtained. Another object is to provide a wheel which contains its own lubricant reservoir and is constructed to disperse the lubricant to the bearings and to retain the lubricant in the hub of the wheel so that a prolonged period of running may be obtained without attention by oilers. A further object is to provide a construction in which all the parts are easily assembled, and a still further object is to provide a construction in which the parts do not tend to be rotated, so as to loosen them by the continued jarring of the vehicle on which the wheel is provided.

In the accompanying drawings are illustrated preferred constructions embodying the present invention:

Fig. 1 being a part sectional elevation of a wheel particularly constructed for a colliery tram, in which the open end of the hub is closed by a threaded member;

Fig. 2 is an elevation from the inside of the wheel with the closure and bearings removed;

Fig. 3 is a section on the line 3—3 of Fig. 1 looking in the direction of the arrows;

Fig. 4 is a sectional elevation to a larger scale of the means for permitting injection of lubricant to the hub and for retaining the hub sealed at other times;

Fig. 5 is a view similar to Fig. 1 of a modified construction in which the hub of the wheel is of polygonal shape and is provided with a closure member of corresponding configuration;

Fig. 6 is a similar view to Fig. 2 of the construction shown in Fig. 5; and

Fig. 7 is a pictorial view of the closure member used in the construction shown in Figs. 5 and 6.

Referring first to the construction shown in Figs. 1 to 4, a wheel 10 provided with curved spokes 11 has an integral hub 12, which hub has a solid end 13 and an open end 14. The closure for the open end is indicated at 15, the closure comprising a bearing 16 for the wheel axle 17, and between the wheel axle and its bearing a liner 18 is preferably interposed. The closure 15 comprises also spaced ribs 19 which extend from the bearing to the hub 12. The ribs 19 are preferably integral with the closure 15, and also the bearing 16 is preferably integral with the spaced ribs and also with the closure. Between each pair of ribs is an oil inlet 20 which extends through the bearing to the wheel axle. The closure is fixed to the hub preferably by internally threading the open end of the hub and by externally threading the closure so that it may be screwed in position, a locking pin 21 piercing the hub 12 to engage the latter as well as the closure 15 to prevent internal rotation of the closure.

The closure may also comprise a flange 22 which positively locates the bearing in position when engaging against the faced open end 14.

In order to prevent relative movement between the closure 15 and the liner 18, a locking pin 23 may be provided.

As the wheel rotates about the axle 17 the ribs act as paddles and lift the oil contained in the reservoir formed by the hub and its closure, and then the lifted oil flows down the ribs which guide it to the inlets.

It will be noticed that the ribs 19 extend only into the hub for the length of the bearing. This arrangement assures flow of oil in between the ribs 19 from the space beyond them which is not obstructed.

The solid end 13 of the hub is formed to provide a housing for a hollow bolt 24 passing through the solid end and secured on the inside of the hub by a nut 25, a spring controlled valve 26 being suitably located within the bolt to normally close communication from the outside of the hub to the inside, through the hollow bolt and then radially through the ports 27 formed in the wall of the bolt. At the position of housing the hollow bolt it is preferred to form a boss 28 on the interior face and to slot the interior face as indicated at 29 to allow a free passage of oil from the radial ports 27 to the inside of the hub. Further, the extent of the boss is such as to provide a limit stop for the end of the axle on the inside of the hub. The axle is prevented from moving outside the hub through the closure by forming on the inner end a groove 30 in which is located a ring 30ª.

The construction of the spring controlled valve 26 housed within the hollow bolt 24 is clearly indicated in Fig. 4, wherein it will be seen that the stem of the valve is provided with an enlarged guide portion 26ª which is guided by the interior face of the hollow bolt 24; the head of the valve is of convex nature, as indicated at 26ᵇ, and takes seating on a conical face 24ª in the interior of the hollow bolt. The valve is kept against the seating by a spring 26ᶜ which is pressed against the opposite end of the valve by a threaded plug 24ᵇ engaging in the threaded interior of the bolt. The tension of the spring is therefore adjustable.

Referring now to the construction shown in Figs. 5 to 7, the hub is of polygonal form comprising three straight sides 31 connected by intermediate sides 32 having central protruding ribs 33. With such construction the closure 34 is a cylindrical member which is fixed in position by bolts 35 which pass through the open end of the hub at the end of a rib 33, the open end being in such position of the nature of a flange, which will be clearly understood by considering Figs. 5 and 6.

The closure 34 is provided with an hexagonal ridge 36 recessed at intervals, as indicated at 37, to permit the closure to pass the ribs 33 on the hub. The closure comprises also a bearing and ribs integral with the closure as in the construction previously described. One of the faces of the ridge in between recesses, such as 37, is slotted as indicated at 38, for the part reception of a locking pin 39, which is driven through the wall of the hub, thereby positively preventing axial movement of the closure member through loosening of the bolts 35. The remaining parts of the hub casing and the location of the wheel axle are constructed and obtained in exactly the same manner as described with reference to Figs. 1 to 4, as indicated by the insertion of similar references in Figs. 5 to 7.

The closure on the other side to the bearing may be extended by a boss 40 to lengthen the bearing for the wheel axle, and such boss may be strengthened by webs 41, as shown in Fig. 5.

In either of the constructions shown, and as illustrated in Fig. 1, it is preferred that the liner or bush 18 be provided with an endless groove at each end, indicated by the references 42, 43, the groove 42 being the groove at the inner end and associated with the oil inlet 20. These grooves are connected by left and right handed helical grooves 44, 45, the helical grooves extending from the inner end of the liner, as will be clearly seen by reference to Fig. 1, and terminating in the oil groove 43, being the groove at the outer end of the bush or liner.

By such a construction in either direction of rotation oil is transmitted longitudinally of the wheel axle so that an efficient lubrication obtains between the bush or liner and the axle.

I claim:—

1. In a wheel, a hollow hub having one end solid and the other end open, a closure for the open end, a bearing for the wheel axle carried by the said closure, spaced ribs extending between said hub and said bearing, a bush in said bearing having an endless oil groove at each end connected together by a right hand and a left hand helical groove, which helical grooves extend to the end of the bush at the inner end, but terminate in the endless groove at the outer end, and which inner endless groove is connected by oil supply holes registering with oil inlets starting from the spaces between the said ribs.

2. In a wheel, a hollow hub having one end solid and the other end open, screw threads on said open end, a threaded closure for the open end, a locking pin engaging said open end and said closure, a bearing for the wheel axle carried by said closure, and spaced ribs extending between said hub and said bearing, the said bearing having oil inlets to said axle starting from the spaces between said ribs.

3. In a wheel, a hollow hub having one end solid and the other end open, screw threads on said open end, a flanged threaded closure for the open end, a locking pin engaging said open end and said closure, a bearing for the wheel axle carried by said closure, and spaced ribs extending between said hub and said bearing, the said bearing having oil inlets to said axle starting from the spaces between said ribs, whereby oil in the hub is lifted by said ribs and guided towards said oil inlets.

4. In a wheel, a hollow hub having one end solid and the other end open, screw threads on said open end, a threaded closure for the open end, a locking pin engaging said open end and said closure, a bearing integral with said closure for the wheel axle, and spaced ribs extending between said hub and said bearing, the said bearing having oil inlets to said axle starting from the spaces between said ribs, whereby oil in the hub is lifted by said ribs and guided towards said oil inlets.

5. In a wheel, a hollow hub having one end solid and the other end open, screw threads on said open end, a threaded closure for the open end, a locking pin engaging said open end and said closure, a bearing integral with said closure for the wheel axle, spaced ribs extending between said hub and said bearing, a bush in said bearing having an endless oil groove at each end connected together by a right-hand and left-hand helical groove, which helical grooves extend to the end of the bush at the inner end, but terminate in the endless groove at the outer end, and which inner endless groove is connected by oil supply holes registering with oil inlets starting from the spaces between said ribs.

6. In a wheel, a hollow hub having one end solid and the other end open, a flanged closure for said open end, a bearing for the wheel axle carried by said closure, and spaced ribs integral with said bearing extending between said hub and said bearing, the said bearing having oil inlets to said axle starting from the spaces between said ribs, whereby oil in the hub is lifted by said ribs and guided towards said oil inlets.

7. In a wheel, a hollow hub having one end solid and the other end open, a closure for the open end, a bearing integral with said closure for the wheel axle, and spaced ribs integral with said bearing and extending to said hub, the said bearing having oil inlets to said axle starting from the spaces between said ribs, whereby oil in the hub is lifted by said ribs and guided towards the said oil inlets.

8. In a wheel, a hollow hub having one end solid and the other end open, screw threads on said open end, a flanged threaded closure for the open end, a locking pin engaging said open end and said closure, a bearing integral with said closure for the wheel axle, and spaced ribs integral with said bearing and extending to said hub, the said bearing having oil inlets to said axle starting from the spaces between said ribs, whereby oil in the hub is lifted by said ribs and guided towards the said oil inlets.

In testimony whereof I affix my signature.

SILAS REES.